United States Patent
Zeng et al.

(10) Patent No.: US 12,338,395 B2
(45) Date of Patent: Jun. 24, 2025

(54) METHOD AND DEVICE SYSTEM FOR PRODUCING FEED STOCK OF ETHYLENE STEAM CRACKER AND NANO-CARBON MATERIAL FROM WASTE PLASTICS

(71) Applicant: SHANGHAI PHELIX NEW MATERIALS CO., LTD., Shanghai (CN)

(72) Inventors: Yong Zeng, Shanghai (CN); Yong Xia, Shanghai (CN); Xiaoli Wu, Shanghai (CN)

(73) Assignee: SHANGHAI PHELIX NEW MATERIALS CO., LTD., Shanghai (CN)

( * ) Notice: Subject to any disclaimer, the term of this patent is extended or adjusted under 35 U.S.C. 154(b) by 0 days.

(21) Appl. No.: 18/843,833

(22) PCT Filed: May 4, 2023

(86) PCT No.: PCT/CN2023/092054
§ 371 (c)(1),
(2) Date: Sep. 4, 2024

(87) PCT Pub. No.: WO2024/198035
PCT Pub. Date: Oct. 3, 2024

(65) Prior Publication Data
US 2025/0115812 A1   Apr. 10, 2025

(30) Foreign Application Priority Data
Mar. 29, 2023   (CN) .......................... 202310324865.2

(51) Int. Cl.
*C10G 1/10* (2006.01)
*C10G 1/00* (2006.01)
(Continued)

(52) U.S. Cl.
CPC ............... *C10G 1/10* (2013.01); *C10G 1/002* (2013.01); *C10G 5/00* (2013.01); *C10G 65/12* (2013.01);
(Continued)

(58) Field of Classification Search
CPC . C10G 1/10; C10G 1/002; C10G 5/00; C10G 65/12; C10G 2300/1003;
(Continued)

(56) References Cited

U.S. PATENT DOCUMENTS

| | | | |
|---|---|---|---|
| 2019/0023999 A1* | 1/2019 | Sundaram | C10G 9/36 |
| 2020/0332201 A1* | 10/2020 | Koseoglu | C07C 2/06 |
| 2021/0301209 A1* | 9/2021 | Timken | C10G 1/002 |

FOREIGN PATENT DOCUMENTS

| | | |
|---|---|---|
| CN | 1696210 A | 11/2005 |
| CN | 104611060 A | 5/2015 |

(Continued)

OTHER PUBLICATIONS

CN 107934938 translation (Year: 2018).*
(Continued)

*Primary Examiner* — Randy Boyer
*Assistant Examiner* — Juan C Valencia
(74) *Attorney, Agent, or Firm* — Workman Nydegger

(57) ABSTRACT

The present application relates to a method and a device system for producing feed stock of ethylene steam cracker and a nano-carbon material from waste plastics, and the method comprises: firstly, subjecting a waste plastic to thermal pyrolysis to obtain hydrocarbon oil and gas from thermal pyrolysis; then, subjecting the hydrocarbon oil and gas from thermal pyrolysis to gas-liquid separation to obtain crude plastic pyrolysis oil and pyrolysis gas; subsequently, subjecting the pyrolysis gas to decarbonization to obtain a nano-carbon material, and sequentially subjecting the crude
(Continued)

plastic pyrolysis oil to hydrocracking and fractionating to obtain the feed stock of ethylene steam cracker. The device system comprises a thermal pyrolysis unit, a gas-liquid separation unit, a hydrocracking unit, a fractionating unit, and a decarbonization unit. The method and device system provided in the present application can prepare the steam-cracking feedstock of ethylene steam cracker with a high proportion of chain alkanes, which can achieve a higher yield of target products when used to produce downstream products, and the production process has no carbon dioxide emission, and is green and clean. The device system provided in the present application has a simple structure and can be used in industrial application.

14 Claims, 1 Drawing Sheet

(51) Int. Cl.
*C10G 5/00* (2006.01)
*C10G 65/12* (2006.01)

(52) U.S. Cl.
CPC ............. *C10G 2300/1003* (2013.01); *C10G 2300/4006* (2013.01); *C10G 2300/4012* (2013.01); *C10G 2400/20* (2013.01)

(58) Field of Classification Search
CPC .... C10G 2300/4006; C10G 2300/4012; C10G 2400/20
See application file for complete search history.

(56) References Cited

FOREIGN PATENT DOCUMENTS

| CN | 107934938 A | * | 4/2018 |
|---|---|---|---|
| CN | 109642164 A | | 4/2019 |
| CN | 110342462 A | | 10/2019 |
| CN | 114180555 A | | 3/2022 |
| CN | 114507541 A | | 5/2022 |
| CN | 114867823 A | | 8/2022 |
| CN | 114867825 A | | 8/2022 |
| WO | 2021204818 A1 | | 10/2021 |

OTHER PUBLICATIONS

Lu et al. "Study progress on methane catalytic cracking to hydrogen and carbon nanotubes", Modern Chemical Industry, (May 2017), pp. 25-29.
Chinese First Office Action for Chinese Application No. 202310324865.2, dated Nov. 9, 2023, 28 pages with translation.
International Search Report for International Application No. PCT/CN2023/092054, mailed Jun. 20, 2023, 5 pages.

* cited by examiner

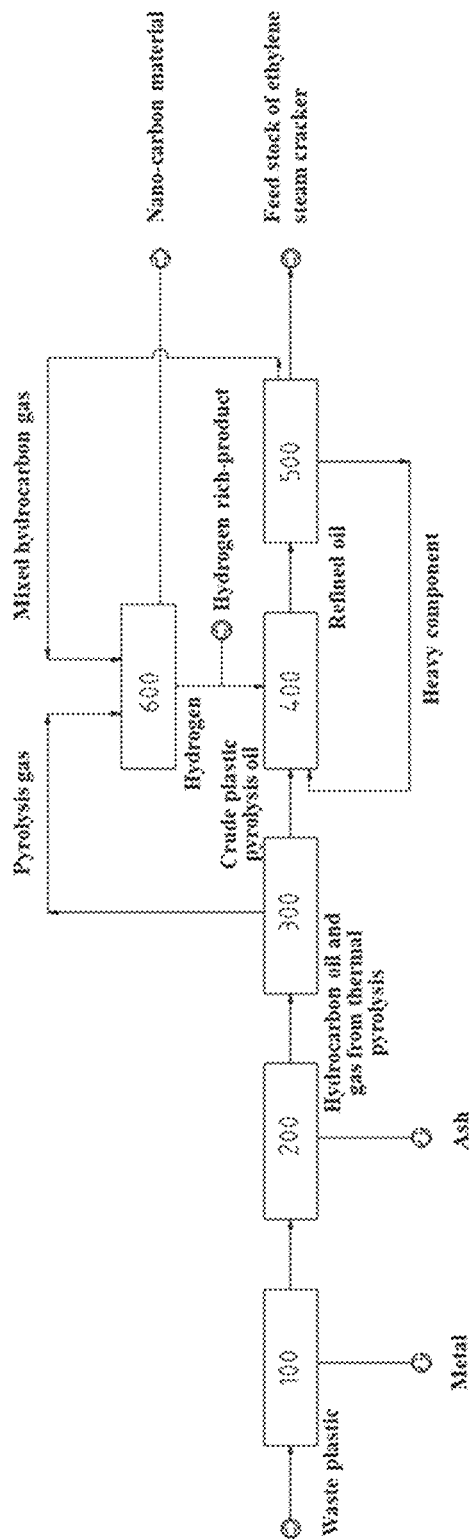

METHOD AND DEVICE SYSTEM FOR PRODUCING FEED STOCK OF ETHYLENE STEAM CRACKER AND NANO-CARBON MATERIAL FROM WASTE PLASTICS

CROSS REFERENCE TO RELATED APPLICATIONS

This application is a 371 of International Patent Application No. PCT/CN2023/092054, filed May 4, 2023, which claims the benefit of Chinese Patent Application No. 202310324865.2, filed Mar. 29, 2023, which are incorporated by reference in their entireties.

TECHNICAL FIELD

The present application relates to the technical field of solid waste resource utilization, such as a method and a device system for producing feed stock of ethylene steam cracker and a nano-carbon material from waste plastics.

BACKGROUND

At present, with the increasing application of plastics, plastic products have become an important part in daily life. However, waste plastics are difficult to degrade naturally, which brings more and more serious environmental problems.

Waste plastics mainly come from municipal solid waste and industrial solid waste, which has a relatively complex composition, mainly including polyethylene (PE), polypropylene (PP), polystyrene (PS), polystyrene foam (PSF), polyvinyl chloride (PVC), polyethylene terephthalate (PET), polyurethane (PU), and ABS plastic. Most waste plastics are a mixture of many types of plastics and also contain impurities such as metal and sand.

The relevant waste plastics treatment methods mainly include landfill, incineration, and recycling, wherein the landfill and incineration are simple but cause serious pollution to the environment. Therefore, plastic recycling to transform waste plastics into effective resources has become a research hotspot in the industry. One mode of the recycling method is to process waste plastics into raw materials which can be used to produce plastics by chemical conversion, which not only solves the reusing problem of waste plastics, but also replaces conventional raw materials in plastics production.

CN113383058A discloses a method for producing polypropylene from waste plastics as raw materials, and in this method, waste plastics are cracked to obtain a hydrocarbon material A, and the hydrocarbon material A and a conventional liquid hydrocarbon raw material are fed into a pyrolysis furnace to prepare an olefin monomer, and then the olefin monomer is prepared into a propylene-based polymer.

In the above method, the cracking hydrocarbon liquid obtained from the waste plastics contains a large number of impurities and unsaturated components, and only no more than 2% of the cracking hydrocarbon liquid are allowed to be added to the raw materials of the cracking furnace, resulting in a low utilization efficiency of the cracking hydrocarbon liquid. In addition, in the actual production, when polyolefin plastics are subjected to thermal cracking, a large amount of small-molecule non-condensable gas and oil with a boiling point of greater than 350° C. will be generated, while in the above method, only the cracking hydrocarbon liquid with a boiling range of 65-350° C. are used as the raw material, which further reduces the utilization rate of waste plastic resources.

Therefore, it is of great significance to provide a method of utilizing waste plastics which has a good product quality, high resource utilization rate, and environmental friendliness.

SUMMARY

The following is a summary of the subject described herein. This summary is not intended to limit the protection scope of the claims.

An object of the present application is to provide a method and a device system for producing feed stock of ethylene steam cracker and a nano-carbon material from waste plastics. Compared with the related art, the feed stock of ethylene steam cracker prepared by the method and the device system in the present application has a high content of chain alkane, which can lead to a higher yield of target products when used to produce downstream products, and the whole process has no carbon dioxide emission, and is green and clean. The device system provided in the present application has a simple structure and can be used in industrial application.

To achieve this object, the present application adopts the following technical solutions.

In a first aspect, an embodiment of the present application provides a method for producing feed stock of ethylene steam cracker and a nano-carbon material from waste plastics, and the method comprises the following steps:
 (1) subjecting a waste plastic to thermal pyrolysis to obtain hydrocarbon oil and gas from thermal pyrolysis;
 (2) subjecting the hydrocarbon oil and gas from thermal pyrolysis obtained in step (1) to gas-liquid separation to obtain crude plastic pyrolysis oil and pyrolysis gas;
 (3) subjecting the pyrolysis gas obtained in step (2) to decarbonization to obtain the nano-carbon material;
 (4) subjecting the crude plastic pyrolysis oil obtained in step (2) to hydrocracking to obtain hydrotreated plastic pyrolysis oil; and
 (5) fractionating the hydrotreated plastic pyrolysis oil obtained in step (4) to obtain the feed stock of ethylene steam cracker.

In the method provided in the embodiment of the present application, by thermal pyrolysis and gas-liquid separation, the pyrolysis gas and crude plastic pyrolysis oil produced from waste plastics are utilized respectively. The pyrolysis gas is decarbonized to fix the carbon element contained therein to avoid the carbon dioxide emission and obtain a nano-carbon material, and the nano-carbon material is a special carbon material with a high purity, a high specific surface area and a high structure, which is widely used and has a high added value; the crude plastic pyrolysis oil is hydrocracked, during which the heavy-component oil is cracked, the unsaturated hydrocarbon is saturated by hydrogenation and the impurities such as chlorine, silicon, sulfur, nitrogen, and oxygen are removed, so as to obtain the feed stock of ethylene steam cracker with a high proportion of chain alkane and a low content of cycloalkane, aromatic hydrocarbon and impurities; compared with the conventional petroleum-based steam-cracking feedstock, the feed stock of ethylene steam cracker can produce more ethylene monomers and propylene monomers when used for the downstream steam-cracking due to its higher content of chain alkane, thereby improving the yield of the target product, and because of the lower content of cycloalkane and aromatic hydrocarbon, the feed stock of ethylene steam cracker is less prone to coking, and the production of the downstream device is more efficient and stable.

In summary, for the method provided by the embodiments of the present application, not only the product has an excellent quality, the yield of the downstream product is high, and the downstream device is less prone to coking during operation, but also the production process has no carbon dioxide emission, which has high economic benefit and environmental benefit.

In one embodiment, the waste plastic in step (1) comprises polyethylene and/or polypropylene.

In one embodiment, the waste plastic is subjected to a pretreatment before the thermal pyrolysis.

In one embodiment, a method of the pretreatment comprises any one or a combination of at least two of magnetic separation, infrared separation, or density separation, wherein a typical but non-limiting combination comprises a combination of magnetic separation and infrared separation or a combination of infrared separation and density separation.

In the embodiment of the present application, the pretreatment can remove impurities from the waste plastic such as metals, stones, sand, and plastics not made of PE or PP, and the method of the pretreatment for removing metals usually adopts magnetic separation or infrared separation, and the method of pretreatment for removing plastics not made of PE or PP usually adopts density separation or infrared separation.

In one embodiment, the thermal pyrolysis in step (1) is performed at a temperature of 400-550° C., which may be, for example, 400° C., 420° C., 450° C., 480° C., 500° C., 520° C., or 550° C.; however, the temperature is not limited to the listed numerical values, and other unlisted numerical values within the numerical range are also applicable.

In the embodiment of the present application, in the process of the thermal pyrolysis, in addition to producing hydrocarbon oil and gas from thermal pyrolysis, ash is also produced, and the ash is mainly caused by fillers such as calcium carbonate and residual sands which exist in waste plastics.

In one embodiment, the pyrolysis gas in step (2) comprises hydrogen and non-condensable hydrocarbon gas.

In one embodiment, the non-condensable hydrocarbon gas comprises C1-C4 gaseous hydrocarbon.

In one embodiment, the decarbonization in step (3) adopts a high-temperature thermal pyrolysis technology.

In the embodiment of the present application, the decarbonization is carried out by the high-temperature thermal pyrolysis technology in the absence of oxygen, and the carbon-hydrogen bonds of the non-condensable hydrocarbon gas are broken in the high-temperature and oxygen-free environment to obtain the hydrogen and the nano-carbon material, such as conductive carbon black and carbon nanotubes.

In one embodiment, the decarbonization is performed at a temperature of 1500-3500° C., which may be, for example, 1500° C., 2000° C., 2500° C., 3000° C., or 3500° C.; however, the temperature is not limited to the listed numerical values, and other unlisted numerical values within the numerical range are also applicable.

In the embodiment of the present application, when the decarbonization temperature is too low, that is, the input energy density is insufficient, polyacetylene, charged ions, and polycyclic aromatic hydrocarbon will be subjected to carbon nucleation and continuous polymerization to generate soot, and the soot is a carbon black with a high hydrogen content, which is indistinguishable in appearance by the naked eye from the nano-carbon material prepared in the embodiment of the present application, and the presence of the soot greatly reduces the performance of the carbon material because a large amount of harmful substances of the polycyclic aromatic hydrocarbon are adsorbed on the surface of the soot.

In one embodiment, the decarbonization is performed at a pressure of 0.5-5 MPa, which may be, for example, 0.5 MPa, 1 MPa, 1.5 MPa, 2 MPa, 3 MPa, 4 MPa, or 5 MPa; however, the pressure is not limited to the listed numerical values, and other unlisted numerical values within the numerical range are also applicable.

In the embodiment of the present application, to control the preferred decarbonization pressure can on one hand adjust the molecular size of the nano-carbon material, and on the other hand provide the reaction driver for the system.

In the embodiments of the present application, the temperature and pressure of the decarbonization are preferably controlled in particular ranges, which further enables the gaseous hydrocarbon to be rapidly cracked at a high temperature and promotes the formation of the nano-carbon material to yield the nano-carbon material with a higher added value.

In one embodiment, in the decarbonization, hydrogen is further produced.

In one embodiment, the hydrogen is subjected to purification.

In one embodiment, the purification comprises pressure swing adsorption or membrane separation.

In the embodiment of the present application, a purity of the hydrogen after the purification is more than or equal to 99.9%, preferably more than or equal to 99.99%.

In one embodiment, the hydrogen after the purification is used for the hydrocracking in step (4).

In the embodiment of the present application, the hydrogen after the purification is preferably used as the hydrogen source feedstock for hydrocracking, which can further improve the utilization rate of waste plastics and reduce the treatment cost. At present, the conventional industrial methods of hydrogen production are mainly methane reforming for hydrogen production and electrolysis for hydrogen production. The methane reforming for hydrogen production incurs a large amount of carbon dioxide emission, and about 12 kg of carbon dioxide will be released for every 1 kg of hydrogen produced, which has an adverse impact on the environment; the operation cost of the electrolysis for hydrogen production is relatively high, every 1 kg of hydrogen produced will consume about 50 kilowatt-hours of electricity, and at the same time, the electrolysis for hydrogen production generates the pyrolysis gas by-product unable to handle properly; and as a conventional method, the pyrolysis gas will be directly burned, resulting in a large amount of raw material loss and increasing the carbon dioxide emission. It can be seen that in the embodiment of the present application, the pyrolysis gas is preferably subjected to decarbonization, and the obtained hydrogen is used for hydrocracking, which can effectively improve the utilization rate of raw materials, and avoid the carbon dioxide emission, realizing energy conservation and emission reduction.

In one embodiment, the hydrocracking in step (4) is performed at a temperature of 300-400° C., which may be, for example, 200° C., 220° C., 240° C., 260° C., 280° C., 300° C., 320° C., 340° C., 360° C., 380° C., or 400° C.; however, the temperature is not limited to the listed numerical values, and other unlisted numerical values within the numerical range are also applicable.

In one embodiment, the hydrocracking is performed at a pressure of 3-15 MPa, which may be, for example, 3 MPa, 4 MPa, 6 MPa, 8 MPa, 10 MPa, 12 MPa, 14 MPa, or 15 MPa; however, the pressure is not limited to the listed numerical values, and other unlisted numerical values within the numerical range are also applicable.

In the embodiment of the present application, the hydrocracking reaction is performed in a fixed bed having a catalyst or a suspended bed having a catalyst.

In one embodiment, a heavy component and mixed hydrocarbon gas are also obtained after the fractionating in step (5).

In one embodiment, a fraction range of the heavy component is 350-550° C.

In the embodiment of the present application, the fraction range of the heavy component is preferably controlled, and the heavy component is saturated oil with a high content of chain alkane and a low content of aromatic hydrocarbon and cycloalkane, which can be provided to the downstream unit as hydrogenation tail oil, or returned to the hydrocracking unit for further pyrolysis into the steam-cracking feedstock for the ethylene plant.

In one embodiment, the heavy component is used back for the hydrocracking in step (4).

In one embodiment, the mixed hydrocarbon gas comprises C1-C4 gaseous hydrocarbon.

The mixed hydrocarbon gas component obtained in the embodiment of the present application is pure, and is a high-quality raw material for manufacturing carbon materials. In the process of the conventional oil furnace method or the acetylene black method for manufacturing carbon materials, the raw materials used often contain heavy metals, sulfur and other contaminants, from which a carbon black product with high cleanliness is hardly prepared.

In one embodiment, the mixed hydrocarbon gas is used back for the decarbonization in step (3).

In one embodiment, a fraction range of the feed stock of ethylene steam cracker is 65-400° C.

In the embodiment of the present application, the feed stock of ethylene steam cracker is used in a downstream steam-cracking furnace, which can produce olefin monomers such as ethylene, propylene, and butadiene, and thus produce polyethylene and polypropylene, and because of a high proportion of chain alkane and a low content of aromatic hydrocarbon and other impurities in the feed stock of ethylene steam cracker obtained in the embodiment of the present application, the pyrolysis performance is far superior to that of the conventional petroleum-based steam-cracking feedstock.

As an optional technical solution of the first aspect in the present application, the method comprises the following steps:

(1) subjecting a waste plastic to a pretreatment, where a method of the pretreatment comprises any one or a combination of at least two of magnetic separation, infrared separation, or density separation, and then performing thermal pyrolysis at a temperature of 400-550° C. to obtain hydrocarbon oil and gas from thermal pyrolysis;

(2) subjecting the hydrocarbon oil and gas from thermal pyrolysis obtained in step (1) to gas-liquid separation to obtain crude plastic pyrolysis oil and pyrolysis gas;

(3) subjecting the pyrolysis gas obtained in step (2) to decarbonization at a temperature of 1500-3500° C. and a pressure of 0.5-5 MPa by a high-temperature thermal pyrolysis technology to obtain the nano-carbon material and hydrogen, and subjecting the hydrogen to pressure swing adsorption or membrane separation and then using in step (4);

(4) subjecting the crude plastic pyrolysis oil obtained in step (2) to hydrocracking at a temperature of 300-400° C. and a pressure of 3-15 MPa to obtain hydrotreated plastic pyrolysis oil; and (5) fractionating the hydrotreated plastic pyrolysis oil obtained in step (4) to obtain the feed stock of ethylene steam cracker, a heavy component, and mixed hydrocarbon gas, where a fraction range of the feed stock of ethylene steam cracker is 65-400° C., a fraction range of the heavy component is 350-550° C., the mixed hydrocarbon gas comprises C1-C4 gaseous hydrocarbon, the heavy component is used back for the hydrocracking in step (4), and the mixed hydrocarbon gas is used back for the decarbonization in step (3).

In a second aspect, an embodiment of the application provides a device system for producing feed stock of ethylene steam cracker and a nano-carbon material from waste plastics. The device system is used for the method for producing feed stock of ethylene steam cracker and a nano-carbon material from waste plastics according to the first aspect of the present application; the device system comprises a thermal pyrolysis unit, a gas-liquid separation unit, a hydrocracking unit, and a fractionating unit which are connected in sequence; an outlet of the thermal pyrolysis unit is connected to an inlet of the gas-liquid separation unit; an liquid-phase outlet of the gas-liquid separation unit is connected to an inlet of the hydrocracking unit; an outlet of the hydrocracking unit is connected to an inlet of the fractionating unit; a gas-phase outlet of the gas-liquid separation unit is connected to an inlet of a decarbonization unit.

The device system provided in the embodiment of the present application can realize the resource utilization of waste plastics, and produce the feed stock of ethylene steam cracker and the nano-carbon material by the cooperation of the thermal pyrolysis unit, the gas-liquid separation unit, the hydrocracking unit, the fractionating unit, and the decarbonization unit.

In one embodiment, the device system further comprises a pretreatment unit; an outlet of the pretreatment unit is connected to an inlet of the thermal pyrolysis unit.

In the embodiment of the present application, the pretreatment unit is preferably arranged to further remove impurities from the waste plastics.

In one embodiment, a gas-phase outlet of the decarbonization unit is connected to an inlet of the hydrocracking unit.

In the embodiment of the present application, preferably, the gas-phase outlet of the decarbonization unit is connected to the inlet of the hydrocracking unit, whereby the hydrogen obtained by the decarbonization can be used for hydrocracking, improving the utilization rate and saving costs.

In one embodiment, a gas-phase outlet of the fractionating unit is connected to an inlet of the decarbonization unit.

In one embodiment, a heavy-component outlet of the fractionating unit is connected to an inlet of the hydrocracking unit.

In the present application, preferably, the gas-phase outlet of the fractionating unit is connected to the inlet of the decarbonization unit, and the heavy-component outlet of the fractionating unit is connected to the inlet of the hydrocracking unit, so that the yield of the feed stock of ethylene steam cracker and the nano-carbon material can be improved.

Compared with the related art, the present application has the following beneficial effects.

(1) In the present application, the nano-carbon material and hydrogen are prepared from the pyrolysis gas produced from waste plastics, and the nano-carbon material has a high added value, the hydrogen can be used for hydrocracking to prepare the feed stock of ethylene steam cracker, and the method provided in the present application improves the utilization efficiency of the raw material, has no carbon dioxide emission, and has high economic benefit and environmental benefit.

(2) The feed stock of ethylene steam cracker prepared in the present application has the advantages of a high proportion of chain alkane and a low content of aromatic hydrocarbon and other impurities, the content of chain alkane can reach more than or equal to 91.6 wt %, the content of metal impurities and silicon is less than 1 mg/kg, and the content of chlorine, nitrogen, and oxygen is less than or equal to 10 mg/kg; compared with the conventional petroleum-based steam-cracking feedstock, the hydro-treated plastic pyrolysis oil used as steam-cracking feed stock of ethylene plant provided in the present application can have a higher yield of target product production when used in the steam cracker, and in the production process, the output of by-products and wastes is lower, and the downstream device is less prone to coking during operation.

(3) Through the circulation of the mixed hydrocarbon gas and the heavy component, the method provided in the present application can further improve the yield of the feed stock of ethylene steam cracker, reduce the treatment cost, and avoid the generation of the waste and waste gas, so that the treatment process is more green and clean.

(4) The feed stock of ethylene steam cracker prepared in the present application can replace the petroleum-based steam pyrolysis feedstock or be mixed with the petroleum-based steam pyrolysis feedstock to prepare new plastics such as polypropylene and polyethylene, so as to realize the closed-loop recycling of waste plastics in a real sense.

(5) The device system provided in the present application has a simple structure and can be used in industrial application.

Other aspects can be understood after the accompanying drawings and detailed description are read and understood.

BRIEF DESCRIPTION OF DRAWINGS

Accompanying drawings are used to provide a further understanding of the technical solutions herein, form part of the specification, explain the technical solutions together with examples of the present application, and do not limit the technical solutions herein.

FIG. 1 is a structural schematic diagram of the device system in Example 1 in the present application;

reference list: 100—pretreatment unit; 200—thermal pyrolysis unit; 300—gas-liquid separation unit; 400—hydrocracking unit; 500—fractionating unit; and 600—decarbonization unit.

DETAILED DESCRIPTION

The technical solutions of the present application are further described below in terms of embodiments. It should be understood by those skilled in the art that the example are merely intended for assist in the understanding of the present application and should not be regarded as specific limitations of the present application.

In one embodiment, the method for producing feed stock of ethylene steam cracker and a nano-carbon material from waste plastics provided in the present application is performed in a device system for producing feed stock of ethylene steam cracker and a nano-carbon material from waste plastics, and the structural schematic diagram of the device system is shown in FIG. 1, and the device system comprises a thermal pyrolysis unit 200, a gas-liquid separation unit 300, a hydrocracking unit 400, and a fractionating unit 500 which are connected in sequence; an outlet of the thermal pyrolysis unit 200 is connected to an inlet of the gas-liquid separation unit 300; an liquid-phase outlet of the gas-liquid separation unit 300 is connected to an inlet of the hydrocracking unit 400; an outlet of the hydrocracking unit 400 is connected to an inlet of the fractionating unit 500; a gas-phase outlet of the gas-liquid separation unit 300 is connected to an inlet of a decarbonization unit 600; the above device units cooperate with each other to realize the resource utilization of waste plastics and produce feed stock of ethylene steam cracker and the nano-carbon material.

The device system further comprises a pretreatment unit 100; an outlet of the pretreatment unit 100 is connected to an inlet of the thermal pyrolysis unit 200; impurities in waste plastics can be further removed by providing the pretreatment unit 100.

A gas-phase outlet of the decarbonization unit 600 is connected to an inlet of the hydrocracking unit 400, whereby the hydrogen obtained by the decarbonization can be subjected to hydrocracking and improved in utilization rate.

A gas-phase outlet of the fractionating unit 500 is connected to an inlet of the decarbonization unit 600, and a heavy-component outlet of the fractionating unit 500 is connected to an inlet of the hydrocracking unit 400, so that the circulation of the mixed hydrocarbon gas and the heavy component can be realized, and the yield of the feed stock of ethylene steam cracker can be further improved.

Example 1

This example provides a method for producing feed stock of ethylene steam cracker and a nano-carbon material from waste plastics, the structural schematic diagram of the device system used therein is shown in FIG. 1, and the device system comprises a pretreatment unit 100, a thermal pyrolysis unit 200, a gas-liquid separation unit 300, a hydrocracking unit 400, a fractionating unit 500, and a decarbonization unit 600, and the method comprises the following steps:

(1) the polyethylene waste plastic was pretreated in the pretreatment unit 100, and in the pretreatment, magnetic separation was first used to remove impurities such as metal, stone, and sand, and then infrared separation was used to remove the plastic not made of polyethylene, then thermal pyrolysis was performed at 450° C. in the thermal pyrolysis unit 200 to obtain hydrocarbon oil and gas from thermal pyrolysis, and also ash was generated;

(2) the hydrocarbon oil and gas from thermal pyrolysis obtained in step (1) was sent to the gas-liquid separation unit 300 for gas-liquid separation to obtain crude plastic pyrolysis oil and pyrolysis gas;

(3) the pyrolysis gas obtained in step (2) was introduced to the decarbonization unit 600, and decarbonization was performed at a temperature of 3000° C. and a pressure of 2 MPa by a high-temperature thermal pyrolysis technology to obtain a nano-carbon material and hydrogen, and the hydrogen was subjected to membrane separation, thus having a purity of 99.99%, and then used in step (4);
(4) the crude plastic pyrolysis oil obtained in step (2) was sent to the hydrocracking unit 400 for hydrocracking at a temperature of 350° C. and a pressure of 11 MPa to obtain hydrotreated plastic pyrolysis oil; and
(5) the hydrotreated plastic pyrolysis oil obtained in step (4) was sent to the fractionating unit 500 for fractionating to obtain the feed stock of ethylene steam cracker, a heavy component, and mixed hydrocarbon gas, where a fraction range of the feed stock of ethylene steam cracker was 65-400° C., a fraction range of the heavy component was 350-550° C., and the mixed hydrocarbon gas was C1-C4 gaseous hydrocarbon; the heavy component was returned to the hydrocracking unit 400 for use in the hydrocracking in step (4), and the mixed hydrocarbon gas was returned to the decarbonization unit 600 for use in the decarbonization in step (3).

Example 2

This example provides a method for producing feed stock of ethylene steam cracker and a nano-carbon material from waste plastics, the device system used therein is the same as in Example 1, and the method comprises the following steps:
(1) the polypropylene waste plastic was pretreated in the pretreatment unit 100, and in the pretreatment, magnetic separation was first used to remove impurities such as metal, stone, and sand, and then density separation was used to remove the plastic not made of polypropylene, then thermal pyrolysis was performed at 400° C. in the thermal pyrolysis unit 200 to obtain hydrocarbon oil and gas from thermal pyrolysis, and also ash was generated;
(2) the hydrocarbon oil and gas from thermal pyrolysis obtained in step (1) was sent to the gas-liquid separation unit 300 for gas-liquid separation to obtain crude plastic pyrolysis oil and pyrolysis gas;
(3) the pyrolysis gas obtained in step (2) was introduced to the decarbonization unit 600, and decarbonization was performed at a temperature of 1500° C. and a pressure of 1.5 MPa by a high-temperature thermal pyrolysis technology to obtain a nano-carbon material and hydrogen, and the hydrogen was subjected to membrane separation, thus having a purity of 99.99%, and then used in step (4);
(4) the crude plastic pyrolysis oil obtained in step (2) was sent to the hydrocracking unit 400 for hydrocracking at a temperature of 400° C. and a pressure of 3 MPa to obtain hydrotreated plastic pyrolysis oil; and
(5) the hydrotreated plastic pyrolysis oil obtained in step (4) was sent to the fractionating unit 500 for fractionating to obtain the feed stock of ethylene steam cracker, a heavy component, and mixed hydrocarbon gas, where a fraction range of the feed stock of ethylene steam cracker was 65-400° C., a fraction range of the heavy component was 350-550° C., and the mixed hydrocarbon gas was C1-C4 gaseous hydrocarbon; the heavy component was returned to the hydrocracking unit 400 for use in the hydrocracking in step (4), and the mixed hydrocarbon gas was returned to the decarbonization unit 600 for use in the decarbonization in step (3).

Example 3

This example provides a method for producing feed stock of ethylene steam cracker and a nano-carbon material from waste plastics, the device system used therein is the same as in Example 1, and the method comprises the following steps:
(1) the polypropylene waste plastic and polyethylene waste plastic were pretreated in the pretreatment unit 100, and in the pretreatment, magnetic separation was first used to remove impurities such as metal, stone, and sand, and then density separation was used to remove the plastic not made of polypropylene, then thermal pyrolysis was performed at 550° C. in the thermal pyrolysis unit 200 to obtain hydrocarbon oil and gas from thermal pyrolysis, and also ash was generated;
(2) the hydrocarbon oil and gas from thermal pyrolysis obtained in step (1) was introduced to the gas-liquid separation unit 300 for gas-liquid separation to obtain crude plastic pyrolysis oil and pyrolysis gas;
(3) the pyrolysis gas obtained in step (2) was introduced to the decarbonization unit 600, and decarbonization was performed at a temperature of 3500° C. and a pressure of 5 MPa by a high-temperature thermal pyrolysis technology to obtain a nano-carbon material and hydrogen, and the hydrogen was subjected to membrane separation, thus having a purity of 99.99%, and then used in step (4);
(4) the crude plastic pyrolysis oil obtained in step (2) was sent to the hydrocracking unit 400 for hydrocracking at a temperature of 300° C. and a pressure of 15 MPa to obtain hydrotreated plastic pyrolysis oil; and
(5) the hydrotreated plastic pyrolysis oil obtained in step (4) was sent to the fractionating unit 500 for fractionating to obtain the feed stock of ethylene steam cracker, a heavy component, and mixed hydrocarbon gas, where a fraction range of the feed stock of ethylene steam cracker was 65-400° C., a fraction range of the heavy component was 350-550° C., and the mixed hydrocarbon gas was C1-C4 gaseous hydrocarbon; the heavy component was returned to the hydrocracking unit 400 for use in the hydrocracking in step (4), and the mixed hydrocarbon gas was returned to the decarbonization unit 600 for use in the decarbonization in step (3).

Example 4

This example provides a method for producing feed stock of ethylene steam cracker and a nano-carbon material from waste plastics, which differs from Example 1 only in that the heavy component obtained by the fractionating was not used back for the hydrocracking in step (4).

This example provides a device system for producing feed stock of ethylene steam cracker and a nano-carbon material from waste plastics, which differs from Example 1 only in that the heavy-component outlet of the fractionating unit 500 was not connected to the inlet of the hydrocracking unit 400.

Compared to Example 1, the heavy component was not involved in hydrocracking in this example, reducing the yield of the feed stock of ethylene steam cracker by about 25%.

Example 5

This example provides a method for producing feed stock of ethylene steam cracker and a nano-carbon material from waste plastics, which differs from Example 1 only in that the mixed hydrocarbon gas obtained by the fractionating was not used back for the decarbonization in the step (3), and the hydrogen required for the hydrocracking was obtained by electrolysis for hydrogen production.

This example provides a device system for producing feed stock of ethylene steam cracker and a nano-carbon material from waste plastics, which differs from Example 1 only in that the gas-phase outlet of the fractionating unit 500 was not connected to the inlet of the decarbonization unit 600, and the gas-phase outlet of the decarbonization unit was not connected to the inlet of the hydrocracking unit.

Compared to Example 1, in this example, the mixed hydrocarbon gas was not used back for the decarbonization in step (3), thus failing to participate in the hydrogen production; the mixed hydrocarbon gas was combusted, which produced a large amount of carbon dioxide, and caused material loss; and the hydrogen of hydrocracking was obtained by the electrolysis for hydrogen production, which is more energy-consuming and costly.

Comparative Example 1

This comparative example provides a method for producing steam-cracking feedstock from waste plastics, which differs from Example 1 only in that the gas-liquid separation, decarbonization, and hydrocracking were not performed, and the method comprises the following steps:
(1) the polyethylene waste plastic was pretreated, and in the pretreatment, magnetic separation was first used to remove impurities such as metal, stone, and sand, and then infrared separation was used to remove the plastic not made of polyethylene, then thermal pyrolysis was performed at 450° C. to obtain hydrocarbon oil and gas from thermal pyrolysis, and also ash was generated; and
(2) the hydrocarbon oil and gas from thermal pyrolysis obtained in step (1) was fractionated to obtain plastic pyrolysis oil with a fraction range of 65-400° C. and plastic pyrolysis heavy oil with a fraction range of more than 400° C.

In this comparative example, the nano-carbon material cannot be obtained.

Comparative Example 2

This comparative example provides commercially available steam-cracking feedstock.

The total metal content, silicon content, chlorine content, nitrogen content, and oxygen content of the steam-cracking feedstock in Examples 1-5 and Comparative Examples 1-2 are shown in Table 1. The total metal content is measured by the methods of ASTM D5158, ASTM D711, UOP-946, UOP-952, and UOP-938; the silicon content is measured by the methods of ASTM D5158 and ASTM D711; the chlorine content is measured by ASTM D5808-18 method; the nitrogen content is measured by the methods of ASTM D4629 and ASTM D5762; and the oxygen content is measured by chromatography.

The alkane content, olefin content, and aromatic hydrocarbon and cycloalkane content of the steam-cracking feedstock in Examples 1-5 and Comparative Examples 1-2 are shown in Table 2. The chain alkane content, olefin content, and aromatic hydrocarbon and cycloalkane content are measured by SH/T0714 method.

Taking Example 1 as an example, the properties of the nano-carbon material in Example 1 are measured, and the results are shown in Table 3. The iodine absorption value is measured by GB/T 3780.1-2008 method; the DBP oil absorption is measured by HG/T 2152-2011 method; the CTAB adsorption specific surface area is measured by GB/T 3780.5-2008 method; the tinting strength is measured by GB/T 3780.6-2008 method; the heating loss is measured by GB/T 3780.8-2008 method; the ash content is measured by GB/T 3780.10-2008 method; the particle size is measured by GB/T 3781.5-2006 method; and the electrical resistivity is measured by GB/T 3781.9-2006 method.

TABLE 1

| | Metal (Fe, Na, Al, As, Cr, As, Pd, Hg) total content/ (mg/kg) | Silicon content/ (mg/kg) | Chlorine content/ (mg/kg) | Nitrogen content/ (mg/kg) | Oxygen content/ (mg/kg) |
| --- | --- | --- | --- | --- | --- |
| Example 1 | <1 | <1 | 1 | 8 | 1 |
| Example 2 | <1 | <1 | 1 | 10 | 1 |
| Example 3 | <1 | <1 | 1 | 7 | 1 |
| Example 4 | <1 | <1 | 1 | 8 | 1 |
| Example 5 | <1 | <1 | 1 | 8 | 1 |
| Comparative Example 1 | 1.6 | 466 | 16 | 85.6 | 8 |
| Comparative Example 2 | <1 | <1 | 1 | — | <10 |

In Table 1, "—" indicates that the value is not available.

TABLE 2

| | Chain alkane content/wt % | Olefin content/wt % | Aromatic hydrocarbon and cycloalkane content/wt % |
| --- | --- | --- | --- |
| Example 1 | 93.1 | 0.9 | 6 |
| Example 2 | 94.0 | 0.8 | 5.2 |
| Example 3 | 92.4 | 0.6 | 7 |
| Example 4 | 91.6 | 1.4 | 7 |
| Example 5 | 93.1 | 0.9 | 6 |
| Comparative Example 1 | 30.2 | 64 | 5.8 |
| Comparative Example 2 | 65.0 | 1.5 | ≥15 |

TABLE 3

| | Example 1 |
| --- | --- |
| Iodine absorption value/(g/kg) | 412 |
| DBP oil absorption/(ml/100 g) | 230 ± 10 |
| CTAB adsorption specific surface area/($10^3$ m$^2$/kg) | 311 |
| Tinting strength/% | 102 |
| Heating loss/wt % | 0.3 |
| Ash content/wt % | 0.01 |
| Partical size/nm | 30 ± 3 |
| Electrical resistivity/($\Omega \cdot$ m) | 2 |

The following can be seen from Tables 1-3.
(1) As can be seen from Examples 1-5, in the present application, the feed stock of ethylene steam cracker is obtained which has a stable quality and a low impurity content and satisfies the raw material demand of the downstream polyolefin plant, wherein the content of chain alkane can reach more than or equal to 91.6 wt %, the content of metal impurities and silicon is less than 1 mg/kg, and the content of chlorine, nitrogen, and oxygen is less than or equal to 10 mg/kg; taking Example 1 as an example, in the present application, the nano-carbon material with excellent performance can be obtained, which has a high purity, a high specific surface area, and a high structure, and has a broad application prospect.
(2) Compared to Comparative Examples 1-2, the steam-cracking feedstock obtained in Example 1 not only has a high purity, but also has a high content of chain alkane, which is more conducive to efficiently converting the steam-cracking feedstock to the target product such as olefin, propylene, and butadiene, while the steam-cracking feedstock obtained in Comparative Examples 1-2 has a high content of impurities and a high content of unsaturated hydrocarbon, and adversely produces a higher number of by-products when used to produce downstream products. It can be seen that the feed stock of ethylene steam cracker provided in the present application can achieve a higher yield of target product, and in the production process, the output of by-products and wastes is lower, and the downstream device is less prone to coking during operation.

In summary, the method and device system provided in the present application can produce the feed stock of ethylene steam cracker with excellent performance and the nano-carbon material with a high added value, which can reduce the treatment cost, avoid the generation of the waste and gas exhaust, and have high economic benefit and environmental benefit.

The applicant declares that the above is only the embodiments of the present application, but the protection scope of the present application is not limited thereto, and those skilled in the art should understand that any change or replacement which can be easily thought of by those skilled in the art within the technical scope disclosed in the present application falls within the scope of protection and disclosure of the present application.

What is claimed is:

1. A method for producing feed stock of ethylene steam cracker and a nano-carbon material from waste plastics, comprising the following steps:
   (1) subjecting a waste plastic to thermal pyrolysis to obtain hydrocarbon oil and gas from thermal pyrolysis;
   (2) subjecting the hydrocarbon oil and gas from thermal pyrolysis obtained in step (1) to gas-liquid separation to obtain crude plastic pyrolysis oil and pyrolysis gas;
   (3) subjecting the pyrolysis gas obtained in step (2) to decarbonization to obtain the nano-carbon material and hydrogen, and subjecting the hydrogen to purification and then using in hydrocracking in step (4);
   (4) subjecting the crude plastic pyrolysis oil obtained in step (2) to hydrocracking to obtain hydrotreated plastic pyrolysis oil; and
   (5) fractionating the hydrotreated plastic pyrolysis oil obtained in step (4) to obtain the feed stock of ethylene steam cracker;
   the decarbonization in step (3) adopts a high-temperature thermal pyrolysis technology;
   the decarbonization is performed at a temperature of 1500-3500° C.;
   the decarbonization is performed at a pressure of 0.5-5 MPa;
   a heavy component and mixed hydrocarbon gas are also obtained after the fractionating in step (5);
   the heavy component is used back for the hydrocracking in step (4);
   the mixed hydrocarbon gas is used back for the decarbonization in step (3).

2. The method according to claim 1, wherein the waste plastic in step (1) comprises polyethylene and/or polypropylene.

3. The method according to claim 1, wherein the waste plastic is subjected to a pretreatment before the thermal pyrolysis.

4. The method according to claim 3, wherein a method of the pretreatment comprises any one or a combination of at least two of magnetic separation, infrared separation, or density separation.

5. The method according to claim 1, wherein the thermal pyrolysis is performed at a temperature of 400-550° C.

6. The method according to claim 1, wherein the pyrolysis gas in step (2) comprises hydrogen and non-condensable hydrocarbon gas.

7. The method according to claim 6, wherein the non-condensable hydrocarbon gas comprises C1-C4 gaseous hydrocarbon.

8. The method according to claim 1, wherein the purification comprises pressure swing adsorption or membrane separation.

9. The method according to claim 1, wherein the hydrocracking in step (4) is performed at a temperature of 300-400° C.

10. The method according to claim 1, wherein the hydrocracking is performed at a pressure of 3-15 MPa.

11. The method according to claim 1, wherein a fraction range of the heavy component is 350-550° C.

12. The method according to claim 1, wherein the mixed hydrocarbon gas comprises C1-C4 gaseous hydrocarbon.

13. The method according to claim 1, wherein a fraction range of the feed stock of ethylene steam cracker is 65-400° C.

14. The method according to claim 1, comprising the following steps:
   (1) subjecting a waste plastic to a pretreatment, where a method of the pretreatment comprises any one or a combination of at least two of magnetic separation, infrared separation, or density separation, and then performing thermal pyrolysis at a temperature of 400-550° C. to obtain hydrocarbon oil and gas from thermal pyrolysis;
   (2) subjecting the hydrocarbon oil and gas from thermal pyrolysis obtained in step (1) to gas-liquid separation to obtain crude plastic pyrolysis oil and pyrolysis gas;
   (3) subjecting the pyrolysis gas obtained in step (2) to decarbonization by a high-temperature thermal pyrolysis technology at a temperature of 1500-3500° C. and a pressure of 0.5-5 MPa to obtain the nano-carbon material and hydrogen, and subjecting the hydrogen to pressure swing adsorption or membrane separation and then using in hydrocracking in step (4);
   (4) subjecting the crude plastic pyrolysis oil obtained in step (2) to hydrocracking at a temperature of 300-400° C. and a pressure of 3-15 MPa to obtain hydrotreated plastic pyrolysis oil; and
   (5) fractionating the hydrotreated plastic pyrolysis oil obtained in step (4) to obtain the feed stock of ethylene steam cracker, a heavy component, and mixed hydrocarbon gas, where a fraction range of the feed stock of ethylene steam cracker is 65-400° C., a fraction range of the heavy component is 350-550° C., the mixed hydrocarbon gas comprises C1-C4 gaseous hydrocarbon, the heavy component is used back for the hydrocracking in step (4), and the mixed hydrocarbon gas is used back for the decarbonization in step (3).

* * * * *